United States Patent
Ye et al.

(10) Patent No.: US 8,849,460 B2
(45) Date of Patent: Sep. 30, 2014

(54) METHOD AND APPARATUS FOR DETERMINING ENGINE PULSE CANCELLATION TORQUE

(75) Inventors: Shaochun Ye, Northville, MI (US); Robert L. Morris, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 191 days.

(21) Appl. No.: 13/483,088

(22) Filed: May 30, 2012

(65) Prior Publication Data

US 2013/0325185 A1    Dec. 5, 2013

(51) Int. Cl.
*G05B 15/02* (2006.01)

(52) U.S. Cl.
USPC ............................................. 700/275; 700/29

(58) Field of Classification Search
None
See application file for complete search history.

(56) References Cited

U.S. PATENT DOCUMENTS

| | | | | |
|---|---|---|---|---|
| 6,768,940 B2 * | 7/2004 | Akiyama et al. | | 701/114 |
| 6,775,610 B2 * | 8/2004 | Akiyama et al. | | 701/114 |
| 6,845,305 B1 * | 1/2005 | Raftari et al. | | 701/22 |
| 7,110,867 B2 * | 9/2006 | Imazu | | 701/22 |
| 7,286,922 B1 * | 10/2007 | Fischer et al. | | 701/51 |
| 7,395,124 B2 * | 7/2008 | Schmidt et al. | | 700/29 |
| 7,558,659 B2 * | 7/2009 | Takamatsu et al. | | 701/51 |
| 7,633,257 B2 * | 12/2009 | Sakamoto et al. | | 318/611 |
| 7,962,256 B2 * | 6/2011 | Stevens et al. | | 701/22 |
| 8,326,475 B2 * | 12/2012 | Yoshida et al. | | 701/22 |
| 8,463,477 B2 * | 6/2013 | Kretschmer et al. | | 701/22 |
| 8,532,852 B2 * | 9/2013 | Falkenstein | | 701/22 |
| 2005/0034538 A1 * | 2/2005 | Rehm et al. | | 73/862.08 |
| 2005/0116677 A1 * | 6/2005 | Tsuruta et al. | | 318/610 |
| 2007/0225887 A1 * | 9/2007 | Morris | | 701/51 |
| 2007/0225889 A1 * | 9/2007 | Morris | | 701/53 |
| 2008/0275624 A1 * | 11/2008 | Snyder | | 701/104 |
| 2009/0105898 A1 * | 4/2009 | Wu et al. | | 701/29 |
| 2009/0112412 A1 * | 4/2009 | Cawthorne et al. | | 701/54 |
| 2009/0118879 A1 * | 5/2009 | Heap et al. | | 701/22 |
| 2009/0118917 A1 * | 5/2009 | Sah et al. | | 701/54 |
| 2009/0118964 A1 * | 5/2009 | Snyder et al. | | 701/99 |
| 2009/0308674 A1 * | 12/2009 | Bhattarai et al. | | 180/65.265 |
| 2010/0019709 A1 * | 1/2010 | Le Neindre et al. | | 318/400.23 |
| 2010/0087996 A1 * | 4/2010 | Haggerty et al. | | 701/58 |
| 2011/0029208 A1 * | 2/2011 | Xia | | 701/58 |
| 2011/0166735 A1 * | 7/2011 | Kustosch | | 701/22 |
| 2011/0213518 A1 * | 9/2011 | Welchko et al. | | 701/22 |
| 2012/0035793 A1 * | 2/2012 | Kang et al. | | 701/22 |
| 2012/0059544 A1 * | 3/2012 | Kinoshita et al. | | 701/22 |
| 2012/0130574 A1 * | 5/2012 | Swales et al. | | 701/22 |
| 2012/0239237 A1 * | 9/2012 | Hashimoto | | 701/22 |
| 2013/0173108 A1 * | 7/2013 | Hashimoto | | 701/22 |

* cited by examiner

*Primary Examiner* — Kavita Padmanabhan
*Assistant Examiner* — Christopher E Everett

(57) ABSTRACT

A method for controlling operation of an electro-mechanical transmission configured to transfer torque among an input member, a plurality of torque machines and an output member includes determining an engine pulse torque, calculating a first motor torque pulse command based upon a first transfer function between the engine pulse torque and a torque command for a first torque machine and the engine pulse torque, calculating a second motor torque pulse command based upon a second transfer function between the engine pulse torque and a torque command for a second torque machine and the engine pulse torque, and controlling the first torque machine in response to the first motor torque pulse command and controlling the second torque machine in response to the second motor torque pulse command.

11 Claims, 2 Drawing Sheets

METHOD AND APPARATUS FOR DETERMINING ENGINE PULSE CANCELLATION TORQUE

TECHNICAL FIELD

This disclosure is related to powertrain systems employing multi-mode transmission devices and internal combustion engines configured to execute autostop and autostart operations.

BACKGROUND

The statements in this section merely provide background information related to the present disclosure. Accordingly, such statements are not intended to constitute an admission of prior art.

Powertrain systems may be configured to transmit torque originating from plural torque generative devices, e.g., internal combustion engines and non-combustion torque machines, through a transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. The non-combustion torque machines may include electric machines that are operative as motors or generators to generate a torque input to the transmission independently of a torque input from the internal combustion engine. The torque machines may transform vehicle kinetic energy, transferred through the vehicle driveline, to electrical energy that is storable in an electrical energy storage device. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

Such powertrain systems may include control systems that execute autostop and autostart control schemes to turn the internal combustion engine on and off during ongoing operation. During an engine start, compression torque pulses are generated in individual engine cylinders and transmitted to a transmission torque damper and an engine block, which may result in objectionable vibrations reaching the vehicle operator, especially at resonant frequencies for the powertrain and various driveline components. The compression torque pulses can disturb engine output torque and can result in objectionable physical vibration and audible noise.

SUMMARY

A method for controlling operation of an electro-mechanical transmission configured to transfer torque among an input member, a plurality of torque machines and an output member includes determining an engine pulse torque, calculating a first motor torque pulse command based upon a first transfer function between the engine pulse torque and a torque command for a first torque machine and the engine pulse torque, calculating a second motor torque pulse command based upon a second transfer function between the engine pulse torque and a torque command for a second torque machine and the engine pulse torque, and controlling the first torque machine in response to the first motor torque pulse command and controlling the second torque machine in response to the second motor torque pulse command.

BRIEF DESCRIPTION OF THE DRAWINGS

One or more embodiments will now be described, by way of example, with reference to the accompanying drawings, in which.

DETAILED DESCRIPTION

Figure 1:
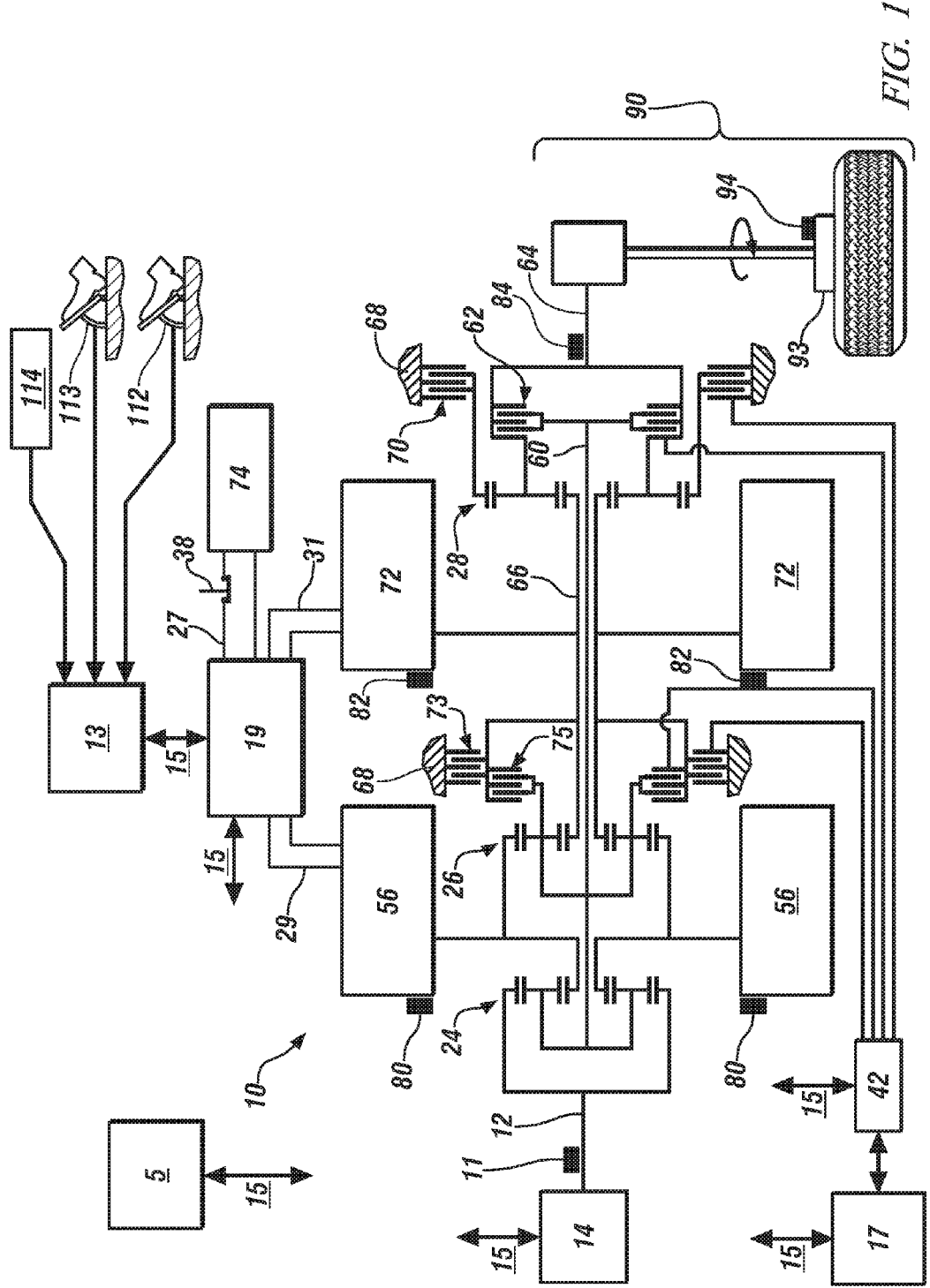
FIG. 1 illustrates a powertrain system including an internal combustion engine, an electro-mechanical transmission, a driveline, and a controller, in accordance with the disclosure.

Referring now to the drawings, wherein the showings are for the purpose of illustrating certain exemplary embodiments only and not for the purpose of limiting the same, FIG. 1 depicts a powertrain system including an internal combustion engine (engine) 14, a multi-mode electro-mechanical transmission (transmission) 10, a driveline 90, and a controller 5. The transmission 10 mechanically couples to the engine 14 and includes first and second torque machines 56 and 72, which are electric motor/generators in one embodiment. The engine 14 and first and second torque machines 56 and 72 each generate torque that can be transferred to the transmission 10.

The engine 14 may be any suitable combustion device, and includes a multi-cylinder internal combustion engine selectively operative in several states to transfer torque to the transmission 10 via an input member 12, and can be either a spark-ignition or a compression-ignition engine. The engine 14 includes a crankshaft operatively coupled to the input member 12 of the transmission 10. A rotational speed sensor 11 monitors crank angle and rotational speed of the input member 12. Power output from the engine 14, i.e., rotational speed and engine torque, can differ from the input speed and the input torque to the transmission 10 due to placement of torque-consuming components on the input member 12 between the engine 14 and the transmission 10, e.g., a torque management device.

The illustrated transmission 10 is a two-mode, compound-split, electro-mechanical transmission 10 that includes three planetary-gear sets 24, 26 and 28, and four engageable torque-transferring devices, i.e., clutches C1 70, C2 62, C3 73, and C4 75. Other multi-mode transmissions may instead be employed. As used herein, clutches refer to torque transfer devices that can be selectively applied in response to a control signal, and may be any suitable devices including by way of example single or compound plate clutches or packs, one-way clutches, band clutches and brakes. A hydraulic circuit 42 is configured to control clutch states of each of the clutches, with pressurized hydraulic fluid supplied by an electrically-powered hydraulic pump 17 that is operatively controlled by the controller 5. Clutches C2 62 and C4 75 are hydraulically-applied rotating friction clutches. Clutches C1 70 and C3 73 are hydraulically-controlled brake devices that can be grounded to a transmission case 68. Each of the clutches C1 70, C2 62, C3 73, and C4 75 is hydraulically applied using pressurized hydraulic fluid supplied by the hydraulic control circuit 42 in this embodiment. The hydraulic circuit 42 is operatively controlled by the controller 5 to activate and deactivate the aforementioned clutches, provide hydraulic fluid for cooling and lubricating elements of the transmission, and provide hydraulic fluid for cooling the first and second torque machines 56 and 72. Hydraulic pressure in the hydraulic circuit 42 may be determined by measurement using pressure sensor(s), by estimation using on-board algorithms, or using other suitable methods.

The first and second torque machines 56 and 72 are three-phase AC motor/generator machines, each including a stator and a rotor, and respective resolvers 80 and 82. The motor stator for each machine is grounded to an outer portion of the transmission case 68, and includes a stator core with coiled electrical windings extending therefrom. The rotor for the first torque machine 56 is supported on a hub plate gear that is operatively attached to shaft 60 via the second planetary gear set 26. The rotor for the second torque machine 72 is fixedly attached to a sleeve shaft hub 66. Each of the resolvers 80 and 82 is signally and operatively connected to a transmission power inverter control module (TPIM) 19, and each senses and monitors rotational position of the resolver rotor relative to the resolver stator, thus monitoring rotational position of respective ones of first and second torque machines 56 and 72. Additionally, the signals output from the resolvers 80 and 82 may be used to determine rotational speeds for first and second torque machines 56 and 72.

The transmission 10 includes an output member 64, e.g. a shaft, which is rotatably connected to the driveline 90 to provide output power to the driveline 90 that is transferred to vehicle wheels 93, one of which is shown in FIG. 1. The output power at the output member 64 is characterized in terms of an output rotational speed and an output torque. A transmission output speed sensor 84 monitors rotational speed and rotational direction of the output member 64. Each of the vehicle wheels 93 is preferably equipped with a sensor 94 adapted to monitor wheel speed to determine vehicle speed, and absolute and relative wheel speeds for braking control, traction control, and vehicle acceleration management.

The input torque from the engine 14 and the motor torques from the first and second torque machines 56 and 72 are generated as a result of energy conversion from fuel or electrical potential stored in an electrical energy storage device (ESD) 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors for converting DC power from the ESD 74 to AC power for powering respective ones of the first and second torque machines 56 and 72, by switching at high frequencies. The insulated gate bipolar transistors form a switch mode power supply configured to receive control commands. Each of the three-phase electric machines includes a pair of insulated gate bipolar transistors for each phase. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 56 and 72 for operation as motors or generators via transfer conductors 29 and 31 respectively.

The TPIM 19 transfers electrical power to and from the first and second torque machines 56 and 72 through the pair of power inverters and respective motor control modules in response to the motor torque commands. Electrical current is transmitted to and from the ESD 74 in accordance with whether the ESD 74 is being charged or discharged.

The controller 5 signally and operatively links to various actuators and sensors in the powertrain system via a communications link 15 to monitor and control operation of the powertrain system, including synthesizing information and inputs, and executing algorithms to control actuators to meet control objectives related to fuel economy, emissions, performance, drivability, and protection of hardware, including batteries of ESD 74 and the first and second torque machines 56 and 72. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the TPIM 19. A user interface 13 is preferably signally connected to a plurality of devices through which a vehicle operator directs and commands operation of the powertrain system. The devices preferably include an accelerator pedal 113, an operator brake pedal 112, a transmission range selector 114 (PRNDL), and a vehicle speed cruise control. The transmission range selector 114 may have a discrete number of operator-selectable positions, including the rotational direction of the output member 64 to enable one of a forward and a reverse direction. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The transmission 10 is configured to operate in one of several states that can be described in terms of engine states including one of an engine-on state (ON) and an engine-off state (OFF), and transmission ranges including fixed gear and variable (EVT) modes, described with reference to Table 1, below.

TABLE 1

| Description | Engine State | Transmission Range | Applied Clutches | |
|---|---|---|---|---|
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

The transmission ranges are described in Table 1 indicate the specific applied one(s) of clutches C1 70, C2 62, C3 73, and C4 75 for each of the ranges. For purposes of this description, when the engine state is OFF, the engine input speed is equal to 0 RPM, i.e., the engine crankshaft is not rotating. A fixed gear operation provides a fixed ratio operation of input-to-output speed of the transmission 10. In response to operator input via the accelerator pedal 113, the brake pedal 112, and the transmission range selector 114, as captured by the user interface 13, the control module 5 determines torque commands to control the torque actuators including the engine 14 and the first and second torque machines 56 and 72 to meet the output torque request at the output member 64 for transference to the driveline 90.

Figure 2:
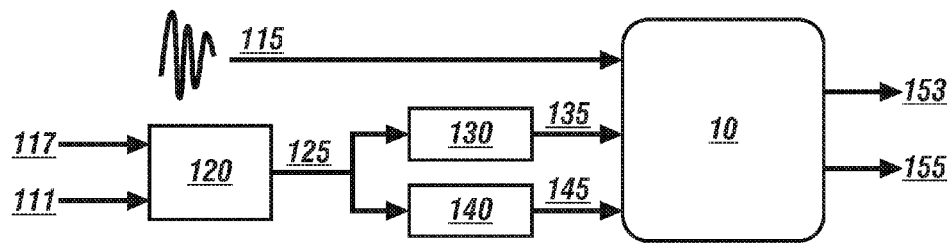
FIG. 2 illustrates a control scheme for controlling operation of the powertrain system described with reference to FIG. 1 during engine autostart and autostop operations, in accordance with the disclosure.

FIG. 2 schematically shows a control scheme 100 for controlling operation of an embodiment of the powertrain system described with reference to FIG. 1 including controlling the first and second torque machines 56 and 72 during non-firing engine operation in response to input torque 115, engine crank angle 117, and manifold pressure 111. Non-firing engine operation includes engine autostart operations prior to firing and/or fueling the engine 14 and engine autostop operations subsequent to discontinuing firing and/or fueling the engine. The control scheme 100 is executed in the controller 5 as one or more routines and calibrations. The control scheme 100 operates to control output states of the electro-mechanical transmission 10, including determining engine pulse torque cancellation commands that are used to control the first and second torque machines 56 and 72 during engine autostart and autostop operations, including when the engine 14 is unfired. As shown the output states of the electro-mechanical transmission 10 preferably include the input speed Ni 153 of the input member 12 and the motor B speed Nb 155 from the second torque machine 72. The output speed of the output member 64 is not selected as an output state because it is uncontrolled during operation that includes the transmission operating in Neutral.

A cylinder torque model 120 may be employed to determine an estimated engine pulse torque 125 using engine parameters including engine crank angle 117 and manifold pressure 111. The engine parameters including engine crank angle 117 and manifold pressure 111 are used to determine cylinder pulse torque on each of the unfired cylinders. The engine crank angle 117 may be directly measured using the rotational speed sensor 11 or may be determined based upon the rotational position of the input member 12 of the transmission 10, taking into account angular twist across the input member 12 and the torque damper device 20, in accordance with the following relationship:

$$\theta_E = \theta_I + \theta_T - (\theta_A * K1) - (\theta_B * K2) \quad [1]$$

wherein
$\theta_E$ represents the engine crank angle,
$\theta_I$ represents the rotational position of the input member 12, which may be determined based upon inputs from the resolvers 80 and 82,
$\theta_T$ represents angular twist across the input member 12 and the torque damper device 20,
$\theta_A$ represents rotational position of the first torque machine 56,
$\theta_B$ represents rotational position of the second torque machine 72, and
K1 and K2 are parametric values representing known mechanical gear ratios of the planetary gears 24, 26, and 28 of the electro-mechanical transmission 10 and the quantity of lobes (resolution) of the resolvers 80 and 82.

The cylinder torque model 120 calculates a cylinder pulse torque for each of the cylinders based upon the engine crank angle 117 and manifold pressure 111, which may be used to estimate cylinder pressure. The cylinder pressure is based upon compression pulses generated by crankshaft rotation. Each cylinder pulse torque is predicted by multiplying a torque ratio by the cylinder pressure. The torque ratio is determined for each cylinder as a function of crank angle, which encompasses changes in cylinder geometry and cylinder friction.

The cylinder pressure in an unfired cylinder may be estimated in accordance with the following relationship:

$$(P*V)^{1.3} = \text{constant} \quad [2]$$

wherein
P is cylinder pressure which can be determined based upon intake air mass and temperature, and
V is cylinder volume.

When the engine is not firing, the cylinder pressure can be estimated as an adiabatic compression, i.e., having minimal or no heat transfer. Cylinder pressure for the unfired cylinder with both the intake and exhaust valves closed can be estimated in accordance with the following relationship:

$$P2 = P1 * (V1/V2)^{1.3} \quad [3]$$

wherein
P2 represents current cylinder pressure, and
P1 represents cylinder pressure determined at a most recently occurring valve transition,
V1 represents combustion chamber volume at a most recently previously occurring valve transition, and
V2 represents current combustion chamber volume determined based upon the engine crank angle and piston position.

When the exhaust valves are open, the current cylinder pressure P2 is determined based upon a first-order lag filter leading to atmospheric pressure, assuming the airflow speeds are sufficiently low that exhaust backpressure is at ambient atmospheric pressure. When the intake valves are open, P2 is determined based upon a first-order lag filter leading to the manifold pressure, assuming the airflow speeds are sufficiently low enough that exhaust backpressure is fixed at atmospheric pressure for all calculations.

When the intake and exhaust valves are closed, necessary data is calculated before the valves close. For forward engine rotation, the intake valve is closing, P1 is initialized to manifold pressure (MAP) and V1 is calculated by using the angle for intake valve closing. For reverse engine rotation, the exhaust valve is closing, P1 is initialized to atmospheric pressure and V1 is calculated by using the angle for exhaust valve opening. Preferably the combustion chamber volumes (V1 and V2) are determined based upon engine crank angle and stored in a lookup table indexed by the combustion chamber volume and correlated to engine crank angle. A correction is also made for cylinder leakage and blow-by past the piston, which is necessary at low engine speeds to achieve correct initial conditions. The correction includes modifying the value for P1 to $P1_{adj}$ to account for losses proportional to the pressure difference between P1 and P2, whereby $P1_{adj}$ is calculated in accordance with the following relationship:

$$P1_{adj}=P1-K*(P2-P_{atm}) \quad [4]$$

wherein K is a predetermined system-specific filter coefficient, i.e., a gain factor.

Each opening and closing event of the intake and exhaust valves is modeled as discrete, i.e., the valve is either open or closed. When one of the valves is transitioned to open, the cylinder pressure is set to one of either manifold pressure (MAP) or exhaust pressure ($P_{EXHAUST}$) which is assumed to be atmospheric pressure. The current cylinder pressure P2 is calculated in accordance with the following relationship:

$$P2=P1*(1-K)+P_{EXHAUST}*K \quad [5]$$

wherein
P2 indicates current cylinder pressure, and
P1 indicates cylinder pressure determined at the most recently occurring valve transition.

Each valve timing event requires accuracy preferably within five crank angle degrees of rotation. This includes speed-based corrections which are made to account for airflow dynamics and pump-down and leakage of valve lifters.

The effect of valve position and valve timing on cylinder pressure is also modeled. The valve transition events include intake valve opening (IVO), intake valve closing (IVC), exhaust valve opening (EVO) and exhaust valve closing (EVC). With regard to modeling cylinder pressure, crank angle at which IVC occurs is critical, as this initiates engine operation with all the valves closed when the engine is rotating in a positive direction, and the combustion chamber is substantially a closed chamber with pressure varying based upon volume of the combustion chamber. The control scheme monitors crank angle for each cylinder and assigns a valve state flag which indicates whether the intake valve(s) is open/opening, the exhaust(s) valve is open/opening, or both the intake valve(s) and exhaust valve(s) are closed. Valve overlap is ignored because of its minor influence on crank torque. At low and zero engine speed, hydraulic valve lifters tend to leak down on any valves that are in an open state, until either the valve closes or the lifter fully collapses. As engine speed increases the velocity of air exiting the valve increases. Therefore, the valve must open further for similar pressure drop. This is addressed using computational flow dynamics simulations developed off-line with actual valve dynamics to assess the maximum cylinder pressure achieved at piston top-dead-center.

The torque ratio is determined based upon crank angle, and is a function of cylinder pressure (in kPa) determined at each crank angle. Torque ratio parameters are predetermined and include factors related to cylinder geometry and piston friction. A factor for torque ratio can be determined for each cylinder in relation to crank angle. Thus, cylinder pulse torque for a given cylinder includes the estimated cylinder pressure multiplied by the torque ratio. The total cylinder pulse torque, i.e., the estimated engine pulse torque 125, is a sum of the predicted cylinder pulse torque values for each of the cylinders of the engine. The estimated engine pulse torque 125 is thus the engine torque associated with spinning the unfired engine. The estimated engine pulse torque 125 is input to first and second transfer functions 130 and 140 respectively, to determine first and second motor torque pulse commands ΔTa 135 and ΔTb 145, respectively which counteract the actual engine pulse torque 115 and thus eliminate the effect of the actual engine pulse torque 115 upon the monitored output states of the electro-mechanical transmission 10. The first and second transfer functions 130 and 140 are derived as follows.

The transmission system 10 that includes inputs from the engine 14 and the first and second torque machines 56 and 72 including the actual engine pulse torque 115 and the first and second motor torque pulse commands ΔTa 135 and ΔTb 145, respectively, which are determined using the estimated engine pulse torque 125. The output states from the model of the hybrid transmission system 10 include the input speed Ni 153 of the input member 12 and the motor speed Nb 155 of the second torque machine 72. The actual engine pulse torque 115 is considered a disturbance torque for purposes of this analysis. Each relationship between one of the inputs and one of the outputs can be described in terms of a transfer function G. Each transfer function G is a mathematical representation, in terms of spatial or temporal frequency, of the relation between the input and output of a linear, time-invariant system, preferably in the frequency domain. As such, each transfer function G describes dynamics of the physical system and characterizes a relationship between the input and the output, i.e., the input torques and the output states including selected output speeds.

The overall relationship between the torque inputs and the output speeds is described using the following relationships employing transfer functions:

$$Ni=Te*G_{Te2Ni}+Ta*G_{Ta2Ni}+Tb*G_{Tb2Ni} \quad [6]$$

$$Nb=Te*G_{Te2Nb}+Ta*G_{Ta2Nb}+Tb*G_{Tb2Nb} \quad [7]$$

wherein
$G_{Te2Ni}$ is the transfer function between the engine (disturbance) torque Te and the input speed Ni;
$G_{Ta2Ni}$ is the transfer function between the Motor A torque command Ta and the input speed Ni;
$G_{Tb2Ni}$ is the transfer function between the Motor B torque command Tb and the input speed Ni;
$G_{Te2Nb}$ is the transfer function between the engine (disturbance) torque Te and the Motor B speed Nb;
$G_{Ta2Nb}$ is the transfer function between the Motor A torque command Ta and the Motor B speed Nb; and
$G_{Tb2Nb}$ is the transfer function between the Motor B torque command Tb and the Motor B speed Nb.

When the system is as described herein, and there is a desire for the first and second motor torque pulse commands ΔTa 135 and ΔTb 145 to cancel out the estimated engine pulse torque 125, each of EQS. 6 and 7 may be set equal to zero and simultaneously solved, yielding the following relationships:

$$Ni = Te^* G_{Te2Ni} + Te^* G_{Te2Ta}^* G_{Ta2Ni} + Te^* G_{Te2Tb}^* G_{Tb2Ni} \quad [8]$$

$$Nb = Te^* G_{Te2Nb} + Te^* G_{Te2Ta}^* G_{Ta2Nb} + Te^* G_{Te2Tb}^* G_{Tb2Nb} \quad [9]$$

wherein
- $G_{Te2Ta}$ is the transfer function between the input torque Te and the Motor A torque command Ta; and
- $G_{Te2Tb}$ is the transfer function between the input torque Te and the Motor B torque command Tb.

Certain torque states and transfer function relationships are known, or can be derived for the system, including Te, $G_{Te2Ni}$, $G_{Ta2Ni}$, $G_{Tb2Ni}$, $G_{Te2Nb}$, $G_{Ta2Nb}$, and $G_{Tb2Nb}$. Thus, EQS. 8 and 9 are reduced to two equations and two unknowns, with the unknowns including the transfer functions of $G_{Te2Ta}$ and $G_{Te2Tb}$. EQS. 8 and 9 may be simultaneously solved to determine the transfer functions $G_{Te2Ta}$ and $G_{Te2Tb}$ in accordance with the following relationships.

$$G_{Te2Tb} = \frac{G_{Te2Nb} \cdot G_{Ta2Ni} - G_{Ta2Nb} \cdot G_{Te2Ni}}{G_{Ta2Nb} \cdot G_{Tb2Ni} - G_{Tb2Nb} \cdot G_{Ta2Ni}} \quad [10]$$

$$G_{Te2Ta} = \frac{-(G_{Te2Ni} + G_{Tb2Ni} \cdot G_{Te2Tb})}{G_{Ta2Ni}} \quad [11]$$

The transfer functions $G_{Te2Ta}$ and $G_{Te2Tb}$ are employed with the estimated engine pulse torque 125 to calculate the first and second motor torque pulse commands ΔTa 135 and ΔTb 145 in accordance with the following relationships.

$$\Delta Ta = Te^* G_{Te2Ta} \quad [12]$$

$$\Delta Tb = Te^* G_{Te2Tb} \quad [13]$$

Figure 3:
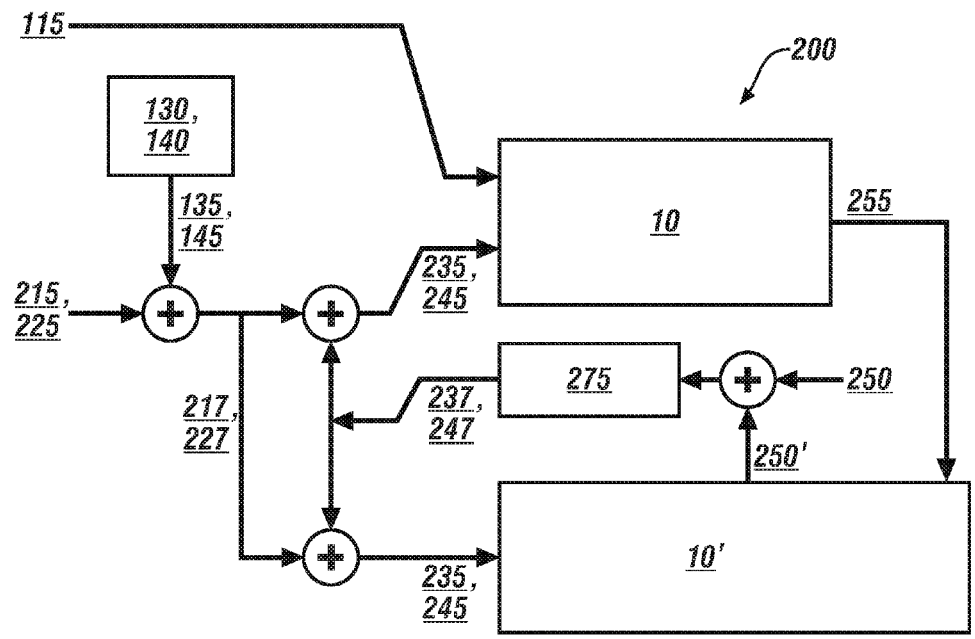
FIG. 3 illustrates a closed-loop speed control system including the powertrain system and configured to employ first and second transfer functions to control operation of the powertrain system during engine autostart and autostop operations, in accordance with the disclosure.

FIG. 3 schematically shows an embodiment of a closed-loop speed control system 200 that includes the powertrain system 10 and is configured to employ the first and second transfer functions $G_{Te2Ta}$ 130 and $G_{Te2Tb}$ 140 to control operation of the powertrain system 10 including during engine autostart and autostop operations. The closed-loop speed control system 200 includes the powertrain system 10, a powertrain system estimator 10', and a feedback controller 275. The estimator 10' is configured to estimate various powertrain states 250' based upon first and second final motor torque commands 235 and 245, respectively, and monitored output states 255, which are delayed. The estimated powertrain states 250' are compared to known state references 250, and employed by the feedback controller 275 to determine first and second torque errors 237 and 247 respectively. The state references 250, estimated powertrain states 250' and the output states 255 each include a plurality of speeds and torques that are preferably arranged in a vector format for use in the control module. Exemplary speeds preferably include the input speed Ni of the input member 12 and the motor B speed Nb from the second torque machine 72, which have been previously described, as well as motor A speed from the first torque machine 56 and the output speed of the output member 64. Exemplary torques may include clutch torques.

Inputs to the closed-loop speed control system 200 include the open-loop motor torque commands Ta 215 and Tb 225, which are determined in response to an output torque request. The first and second transfer functions 130 and 140 use the estimated engine pulse torque 125 to determine the first and second motor torque pulse commands ΔTa 135 and ΔTb 145. The open-loop motor torque commands Ta 215 and Tb 225 are added to the first and second motor torque pulse commands ΔTa 135 and ΔTb 145 to determine first and second initial motor torque commands Ta 217 and Tb 227, respectively, which are combined with the first and second torque errors 237 and 247 to determine the first and second final motor torque commands 235 and 245 that are used to control the first and second torque machines 56 and 72. This is an iterative process, with the closed-loop speed control system 200 and all the associated elements and control schemes executed during one of the aforementioned loop cycles to determine the first and second final motor torque commands 235 and 245 that are used to control the first and second torque machines 56 and 72 to effectively cancel the estimated engine pulse torque 125.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling operation of an electro-mechanical transmission configured to transfer torque among an input member, a plurality of torque machines and an output member, the method comprising:
   determining an engine pulse torque;
   calculating a first motor torque pulse command based upon a first transfer function between the engine pulse torque and a torque command for a first torque machine and the engine pulse torque;
   calculating a second motor torque pulse command based upon a second transfer function between the engine pulse torque and a torque command for a second torque machine and the engine pulse torque; and
   controlling the first torque machine in response to the first motor torque pulse command and controlling the second torque machine in response to the second motor torque pulse command, wherein the first transfer function between the engine pulse torque and the torque command for the first torque machine is determined in accordance with the following relationship:

$$G_{Te2Ta} = \frac{-(G_{Te2Ni} + G_{Tb2Ni} \cdot G_{Te2Tb})}{G_{Ta2Ni}}$$

wherein
- $G_{Te2Ta}$ is a transfer function between the engine pulse torque and the torque command for the first torque machine;
- $G_{Te2Ni}$ is a transfer function between the engine pulse torque and input speed of the input member;
- $G_{Tb2Ni}$ is a transfer function between a torque command for the second torque machine and the input speed of the input member;
- $G_{Te2Tb}$ is a transfer function between the engine pulse torque and the torque command for the second torque machine; and
- $G_{Ta2Ni}$ is a transfer function between the torque command for the first torque machine and the input speed.

2. The method of claim 1, wherein determining the engine pulse torque comprises estimating the engine pulse torque during a non-firing engine operation.

3. The method of claim 2, wherein estimating the engine pulse torque during the non-firing engine operation comprises estimating the engine pulse torque during execution of an autostop operation.

4. The method of claim 2, wherein estimating the engine pulse torque during the non-firing engine operation comprises estimating the engine pulse torque during execution of an autostart operation.

5. Method for controlling operation of an electro-mechanical transmission configured to transfer torque among an input member, a plurality of torque machines and an output member, the method comprising:
   determining an engine pulse torque;
   calculating a first motor torque pulse command based upon a first transfer function between the engine pulse torque and a torque command for a first torque machine and the engine pulse torque;
   calculating a second motor torque pulse command based upon a second transfer function between the engine pulse torque and a torque command for a second torque machine and the engine pulse torque; and
   controlling the first torque machine in response to the first motor torque pulse command and controlling the second torque machine in response to the second motor torque pulse command, wherein the second transfer function between the engine pulse torque and the torque command for the second torque machine is determined in accordance with the following relationship:

$$G_{Te2Tb} = \frac{G_{Te2Nb} \cdot G_{Ta2Ni} - G_{Ta2Nb} \cdot G_{Te2Ni}}{G_{Ta2Nb} \cdot G_{Tb2Ni} - G_{Tb2Nb} \cdot G_{Ta2Ni}}$$

wherein
   $G_{Te2Tb}$ is a transfer function between the engine pulse torque and the torque command for the second torque machine;
   $G_{Te2Nb}$ is a transfer function between the engine pulse torque and the second motor speed;
   $G_{Ta2Ni}$ is a transfer function between the torque command for the first torque machine and the input speed;
   $G_{Ta2Nb}$ is a transfer function between the torque command for the first torque machine and the second motor speed;
   $G_{Te2Ni}$ is a transfer function between the engine pulse torque and the input speed;
   $G_{Tb2Ni}$ is a transfer function between the torque command for the second torque machine and the input speed; and
   $G_{Tb2Nb}$ is a transfer function between the torque command for the second torque machine and the second motor speed.

6. Method for operating an electro-mechanical transmission configured to transfer torque among an input member, first and second torque machines and an output member, the method comprising:
   determining an engine pulse torque during a transition between an engine-off state and an engine-on state;
   determining a first transfer function between the engine pulse torque and a torque command for the first torque machine;
   determining a second transfer function between the engine pulse torque and a torque command for the second torque machine;
   controlling the first torque machine in response to a first motor torque pulse command determined based on the first transfer function and controlling the second torque machine in response to a second motor torque pulse command determined based on the second transfer function, wherein the first transfer function is determined in accordance with the following relationship:

$$G_{Te2Ta} = \frac{-(G_{Te2Ni} + G_{Tb2Ni} \cdot G_{Te2Tb})}{G_{Ta2Ni}}$$

wherein
   $G_{Te2Ta}$ is a transfer function between the engine pulse torque and the torque command for the first torque machine;
   $G_{Te2Ni}$ is a transfer function between the engine pulse torque and input speed of the input member;
   $G_{Tb2Ni}$ is a transfer function between a torque command for the second torque machine and the input speed of the input member;
   $G_{Te2Tb}$ is a transfer function between the engine pulse torque and the torque command for the second torque machine; and
   $G_{Ta2Ni}$ is a transfer function between the torque command for the first torque machine and the input speed.

7. The method of claim 6, wherein determining the engine pulse torque comprises estimating the engine pulse torque during a non-firing engine operation.

8. Method for operating an electro-mechanical transmission configured to transfer torque among an input member, first and second torque machines and an output member, the method comprising:
   determining an engine pulse torque during a transition between an engine-off state and an engine-on state;
   determining a first transfer function between the engine pulse torque and a torque command for the first torque machine;
   determining a second transfer function between the engine pulse torque and a torque command for the second torque machine;
   controlling the first torque machine in response to a first motor torque pulse command determined based on the first transfer function and controlling the second torque machine in response to a second motor torque pulse command determined based on the second transfer function, wherein the second transfer function is determined in accordance with the following relationship:

$$G_{Te2Tb} = \frac{G_{Te2Nb} \cdot G_{Ta2Ni} - G_{Ta2Nb} \cdot G_{Te2Ni}}{G_{Ta2Nb} \cdot G_{Tb2Ni} - G_{Tb2Nb} \cdot G_{Ta2Ni}}$$

wherein
   $G_{Te2Tb}$ is a transfer function between the engine pulse torque and the torque command for the second torque machine;
   $G_{Te2Nb}$ is a transfer function between the engine pulse torque and the second motor speed;
   $G_{Ta2Ni}$ is a transfer function between the torque command for the first torque machine and the input speed;
   $G_{Ta2Nb}$ is a transfer function between the torque command for the first torque machine and the second motor speed;
   $G_{Te2Ni}$ is a transfer function between the engine pulse torque and the input speed;

$G_{Tb2Ni}$ is a transfer function between the torque command for the second torque machine and the input speed; and $G_{Tb2Nb}$ is a transfer function between the torque command for the second torque machine and the second motor speed.

9. Method for operating an electro-mechanical transmission configured to transfer torque between an input member and an output member, the method comprising:
- determining an engine pulse torque during a transition between an engine-off state and an engine-on state;
- determining a first transfer function between the engine pulse torque and a torque command for a first torque machine;
- determining a second transfer function between the engine pulse torque and a torque command for a second torque machine; and
- controlling the first torque machine in response to a first motor torque pulse command determined based on the first transfer function and controlling the second torque machine in response to a second motor torque pulse command determined based on the second transfer function, wherein the first transfer function is determined in accordance with the following relationship:

$$G_{Te2Ta} = \frac{-(G_{Te2Ni} + G_{Tb2Ni} \cdot G_{Te2Tb})}{G_{Ta2Ni}}$$

wherein
- $G_{Te2Ta}$ is a transfer function between the engine pulse torque and the torque command for the first torque machine;
- $G_{Te2Ni}$ is a transfer function between the engine pulse torque and input speed of the input member;
- $G_{Tb2Ni}$ is a transfer function between a torque command for the second torque machine and the input speed of the input member;
- $G_{Te2Tb}$ is a transfer function between the engine pulse torque and the torque command for the second torque machine; and
- $G_{Ta2Ni}$ is a transfer function between the torque command for the first torque machine and the input speed.

10. The method of claim 9, wherein determining the engine pulse torque during the transition between the engine-off state and the engine-on state comprises estimating the engine pulse torque during a non-firing engine operation.

11. Method for operating an electro-mechanical transmission configured to transfer torque between an input member and an output member, the method comprising:
- determining an engine pulse torque during a transition between an engine-off state and an engine-on state;
- determining a first transfer function between the engine pulse torque and a torque command for a first torque machine;
- determining a second transfer function between the engine pulse torque and a torque command for a second torque machine; and
- controlling the first torque machine in response to a first motor torque pulse command determined based on the first transfer function and controlling the second torque machine in response to a second motor torque pulse command determined based on the second transfer function, wherein the second transfer function is determined in accordance with the following relationship:

$$G_{Te2Tb} = \frac{G_{Te2Nb} \cdot G_{Ta2Ni} - G_{Ta2Nb} \cdot G_{Te2Ni}}{G_{Ta2Nb} \cdot G_{Tb2Ni} - G_{Tb2Nb} \cdot G_{Ta2Ni}}$$

wherein
- $G_{Te2Tb}$ is a transfer function between the engine pulse torque and the torque command for the second torque machine;
- $G_{Te2Nb}$ is a transfer function between the engine pulse torque and the second motor speed;
- $G_{Ta2Ni}$ is a transfer function between the torque command for the first torque machine and the input speed;
- $G_{Ta2Nb}$ is a transfer function between the torque command for the first torque machine and the second motor speed;
- $G_{Te2Ni}$ is a transfer function between the engine pulse torque and the input speed;
- $G_{Tb2Ni}$ is a transfer function between the torque command for the second torque machine and the input speed; and
- $G_{Tb2Nb}$ is a transfer function between the torque command for the second torque machine and the second motor speed.

* * * * *